US011375524B2

(12) United States Patent
Zhou et al.

(10) Patent No.: US 11,375,524 B2
(45) Date of Patent: Jun. 28, 2022

(54) TIME ADVANCE ADJUSTMENT DELAY FOR SHORTENED TRANSMISSION TIME INTERVAL UNDER CARRIER AGGREGATION OR DUAL CONNECTIVITY

(71) Applicant: APPLE INC., Cupertino, CA (US)

(72) Inventors: Yuhan Zhou, Santa Clara, CA (US); Jie Cui, Santa Clara, CA (US); Yang Tang, San Jose, CA (US); Hong He, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 157 days.

(21) Appl. No.: 16/462,877

(22) PCT Filed: Aug. 1, 2018

(86) PCT No.: PCT/US2018/044753
§ 371 (c)(1),
(2) Date: May 21, 2019

(87) PCT Pub. No.: WO2019/032343
PCT Pub. Date: Feb. 14, 2019

(65) Prior Publication Data
US 2021/0058946 A1   Feb. 25, 2021

Related U.S. Application Data

(60) Provisional application No. 62/543,025, filed on Aug. 9, 2017, provisional application No. 62/545,202, filed on Aug. 14, 2017.

(51) Int. Cl.
H04W 72/12 (2009.01)
H04W 72/04 (2009.01)

(52) U.S. Cl.
CPC ... *H04W 72/1268* (2013.01); *H04W 72/0446* (2013.01)

(58) Field of Classification Search
CPC .................. H04W 72/1268; H04W 72/0446
See application file for complete search history.

(56) References Cited

U.S. PATENT DOCUMENTS

2013/0039231 A1*  2/2013  Wang .................. H04L 5/001
                                                              370/280
2015/0271723 A1    9/2015  Yang et al.
(Continued)

FOREIGN PATENT DOCUMENTS

CN       102917393 A    2/2013
CN       105099641 A    11/2015
(Continued)

OTHER PUBLICATIONS

3GPP TS 36.133, "3rd Generation Partnership Project; Technical Specification Group Radio Access Network; Evolved Universal Terrestrial Radio Access (E-UTRA); Requirements for support of radio resource management (Release 15)", V15.2.0, Mar. 2018, 3027 pages.
3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", V15.1.0, Mar. 2018, 109 pages.
(Continued)

*Primary Examiner* — Muthuswamy G Manoharan

(57) ABSTRACT

Systems and methods are provided for handling different timing advance (TA) adjustment delays corresponding to different transmission time intervals (TTIs) from different serving cells under carrier aggregation or dual connectivity. A user equipment (UE) selects and implements one TA adjustment delay even if two or more serving cells transmit with different TTIs. In one embodiment, the UE uses a predetermined TA adjustment delay for each of a plurality of TA commands received from serving cells with different TTI lengths. In another embodiment, the UE uses a TA adjustment delay that is a maximum value of the TA adjustment delays for the TTIs from the different serving cells.

18 Claims, 12 Drawing Sheets

(56) References Cited

U.S. PATENT DOCUMENTS

| | | | | |
|---|---|---|---|---|
| 2017/0164310 A1* | 6/2017 | Jeong | ................ | H04W 56/0045 |
| 2018/0332605 A1* | 11/2018 | Pelletier | ............ | H04W 72/1242 |
| 2019/0229878 A1* | 7/2019 | Takeda | .................. | H04W 72/02 |
| 2019/0238275 A1* | 8/2019 | Sun | ....................... | H04L 1/1864 |
| 2020/0029291 A1* | 1/2020 | Siomina | ............ | H04W 56/0045 |
| 2020/0322901 A1* | 10/2020 | Lee | ..................... | H04W 52/365 |

FOREIGN PATENT DOCUMENTS

| | | | | |
|---|---|---|---|---|
| CN | 106465295 A | 2/2017 | | |
| CN | 106797248 A | 5/2017 | | |
| CN | 106797642 A | 5/2017 | | |
| EP | 2775639 A1 * | 9/2014 | ........... | H04L 5/0048 |
| WO | 2016175631 A1 | 11/2016 | | |
| WO | 2018063068 A1 | 4/2018 | | |

OTHER PUBLICATIONS

ETSI TS 136 213, "LTE; Evolved Universal Terrestrial Radio Access (E-UTRA); Physical layer procedures (3GPP TS 36.213 version 13.3.0 Release 13)", V13.3.0, Nov. 2016, 387 pages.

PCT/US2018/044753, International Search Report and Written Opinion, dated Nov. 6, 2018, 16 pages.

Huawei, Hisilicon , "Discussion on the TA adjustment delay for shortened TTI and reduced processing", R4-1705055, 3GPP TSG-RAN WG4 Meeting #83, Hangzhou, China, Agenda Item 9.13.4.1, May 15-19, 2017, 4 pages.

Intel Corporation, "TA adjustment delay for short TTI under single carrier and CA case", R4-1710393, 3GPP TSG-RAN WG4 Meeting #84bits, Dubrovnik, Croatia, Agenda Item 8.23.4.1, Oct. 9-13, 2017, 3 pages.

\* cited by examiner

US 11,375,524 B2

TIME ADVANCE ADJUSTMENT DELAY FOR SHORTENED TRANSMISSION TIME INTERVAL UNDER CARRIER AGGREGATION OR DUAL CONNECTIVITY

RELATED APPLICATIONS

This application is a national stage filing under 35 U.S.C. § 371 of International Patent Application No. PCT/US2018/044753, filed Aug. 1, 2018 which claims the benefit of U.S. Provisional Patent Application No. 62/543,025, filed Aug. 9, 2017, and U.S. Provisional Patent Application No. 62/545,202, filed Aug. 14, 2017, each of which is hereby incorporated by reference herein in its entirety.

TECHNICAL FIELD

This disclosure relates generally to wireless communication systems, and more particularly, to handling time advancement adjustment commands.

BACKGROUND

Wireless mobile communication technology uses various standards and protocols to transmit data between a base station and a wireless mobile device. Wireless communication system standards and protocols can include the third Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) and in MulteFire systems can include a MF-AP. In next generation (NextGen) or fifth generation (5G) wireless RANs, RAN Nodes can include a 5G node, new radio (NR) node or g Node B (gNB).

DETAILED DESCRIPTION OF PREFERRED EMBODIMENTS

Figure 1:
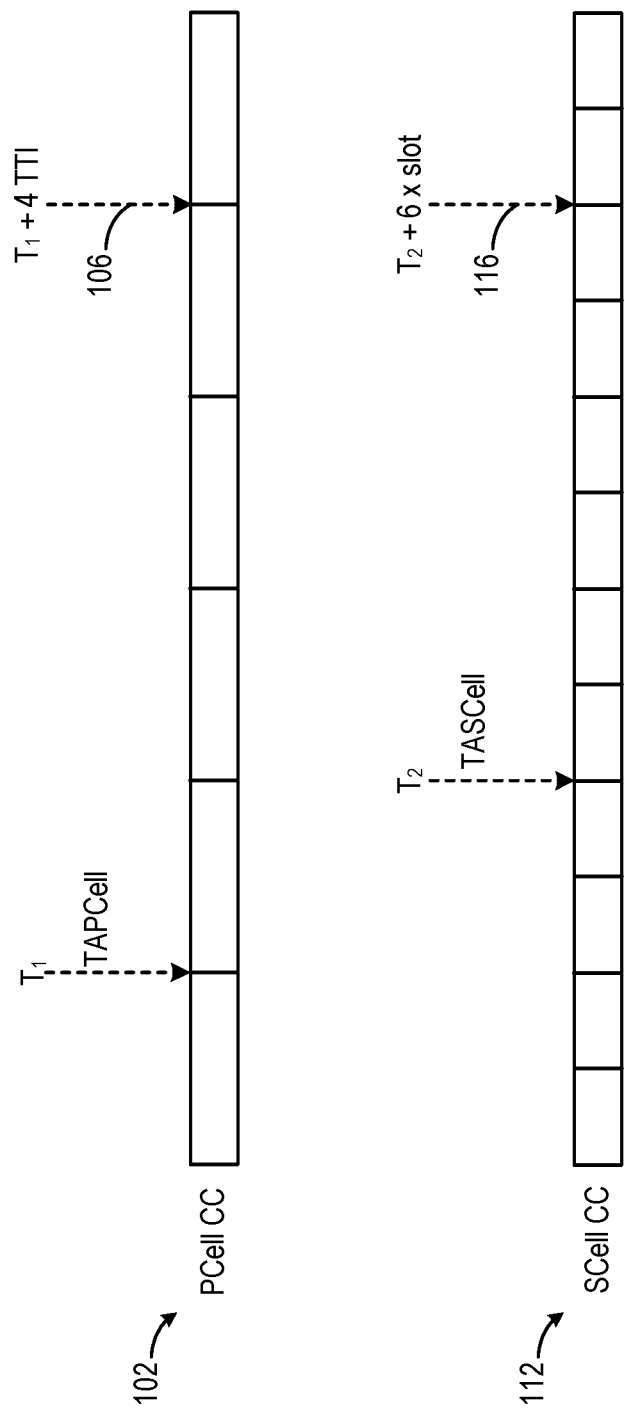
FIG. 1 is a diagram illustrating a timing advance scenario according to one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As discussed in detail below, for a UE configured for carrier aggregation (CA) or dual connectivity (DC), different timing advance (TA) adjustment delays corresponding to different transmission time intervals (TTIs) from different serving cells may result in multiple simultaneous timing adjustments to be made by the UE. In various situations, however, the UE cannot make multiple timing adjustments at the same time. For example, while a CA capable UE may support multiple TAs, a TA command may be associated with a TA group (TAG), wherein the cells in the TAG use the same TA. Thus, in certain CA and/or DC embodiments disclosed herein, the UE selects and implements one unique TA adjustment delay even if two or more serving cells transmit with different TTIs. In one embodiment, the UE uses a predetermined TA adjustment delay for each of a plurality of TA commands received from serving cells with different TTI lengths. For example, under CA, the UE may use a TA adjustment delay of n+5 milliseconds (ms) for both 1 ms TTI and 0.5 ms TTI (or other shortened TTI), where n is a subframe in which a TA command is received. In another embodiment, the UE uses a TA adjustment delay that is a maximum value of the TA adjustment delays for the TTIs from the different serving cells.

Wireless mobile communication technologies may provide for uplink timing. To preserve the orthogonality in uplink, the uplink transmissions from multiple UEs are time aligned at the eNodeB. Because UEs may be located at different distances from the eNodeB, each of the UEs initiates its uplink transmission at different times. A UE far from the eNodeB starts transmission earlier than a UE close to the eNodeB. This may be achieved by TA of the uplink transmissions. Using TA, a UE starts its uplink transmission before a reference time given by the timing of the downlink signal received by the UE. The UE transmission timing may be adjusted, for example, based on TA commands received from the network. A TA adjustment delay specifies how long (or how many subframes or transmission time intervals) the UE waits after receiving a TA command to adjust its timing based on a value received in the TA command. For example, an LTE system may specify that the UE adjusts the timing of its uplink transmission timing at subframe n+6 for a TA command received in subframe n.

To reduce latency, certain wireless networks or cells within a wireless network may use a shortened transmission time interval (TTI). For example, whereas an LTE network uses a 1 ms TTI corresponding to a subframe comprising two 0.5 ms slots that each include seven orthogonal frequency-division multiplexing symbols (OS) (e.g., for normal cyclic prefix), newer systems may include cells configured for 7OS (1-slot) TTI and/or 2OS TTI. Persons skilled in the art will recognize from the disclosure herein that other TTI lengths may also be used, including those based on other subframe, slot, and OS configurations.

For improved performance and processing times, it is useful to reduce the TA adjustment delay for shortened TTI. The TA adjustment delay applied to UEs with legacy (e.g., 1 ms) TTI is defined as n+6 subframes for both single carrier and CA/DC cases, where a TA command is received at subframe n. A number of schemes have been proposed for reducing the TA adjustment delay under shortened TTI for the single carrier case. However, there is also a need to modify the TA adjustment delay under shortened TTI for the CA and/or DC cases. Embodiments herein provide for TA adjustment delay for shortened TTI under CA or DC scenarios.

The TA command may be unicasted through a physical downlink shared channel (PDSCH). In a CA or DC case, it may be impossible for the UE to receive multiple TA commands at the same time or in one subframe. For 1 ms TTI, there may be one unique TA adjustment delay of n+6 TTI. Under the CA case, different TA commands from a primary cell (PCell) and secondary cell (SCell) may not apply simultaneously. One observation under shortened TTI (sTTI) is that if different TA adjustment delays are allowed for CA/DC cases, there may be a situation that the UE is instructed to implement different TA commands from either PCell or SCell simultaneously.

For example, FIG. 1 is a diagram illustrating a timing scenario wherein a UE has been instructed to apply two TA commands simultaneously due to differing TA adjustment delay timing schemes on separate serving cells. In FIG. 1, a UE (not shown) utilizes carrier aggregation and/or dual connectivity methods and is in communication with a PCell (not shown) and an SCell (not shown). The UE receives signals from the PCell on a PCell component carrier (CC) 102 and from the SCell on an SCell component carrier 112. In this example, the PCell component carrier 102 is configured for 1 ms TTI, each TTI corresponding to a subframe (six shown). The SCell component carrier 112 is configured for slot TTI (also referred to herein as 7OS TTI or 0.5 ms TTI), each TTI corresponding to a slot (twelve shown) of a subframe. The UE receives a TA command (TAPCell) with 1 ms TTI from the PCell at time T1 and a TA command (TASCell) with 7OS TTI from the SCell at time T2 (T2=T1+1 ms). In this example, the TA adjustment delay for the 1 ms TTI is n+4 TTI and the TA adjustment delay for the 7OS TTI is n+6 x slot (where TTI=1 slot). Thus, the UE is to implement the TA command (TAPCell) from the PCell at time 106 (T1+4 TTI) and the TA command (TASCell) from the SCell at time 116 (T2+6 x slot), where the time 106 is the same as the time 116. This may be problematic because the two TA commands (TAPCell and TASCell) may include different TA values for the UE to apply. The UE response in this situation is undefined.

Certain embodiments herein avoid the scenario shown in FIG. 1 using a single TA adjustment delay for different TTI lengths. Instead of using different TA adjustment delays corresponding to different TTI lengths or durations from one or more of a plurality of serving cells, a UE is instead configured to use a single TA adjustment delay on each of the TA commands received on one or more component carriers. Using a single TA adjustment delay value for shortened TTI under carrier aggregation can successfully address the issue that one UE might implement multiple timing adjustments at the same time if different TA adjustment delays are applied for different TTIs in the carrier aggregation/dual connectivity case.

Figure 2:
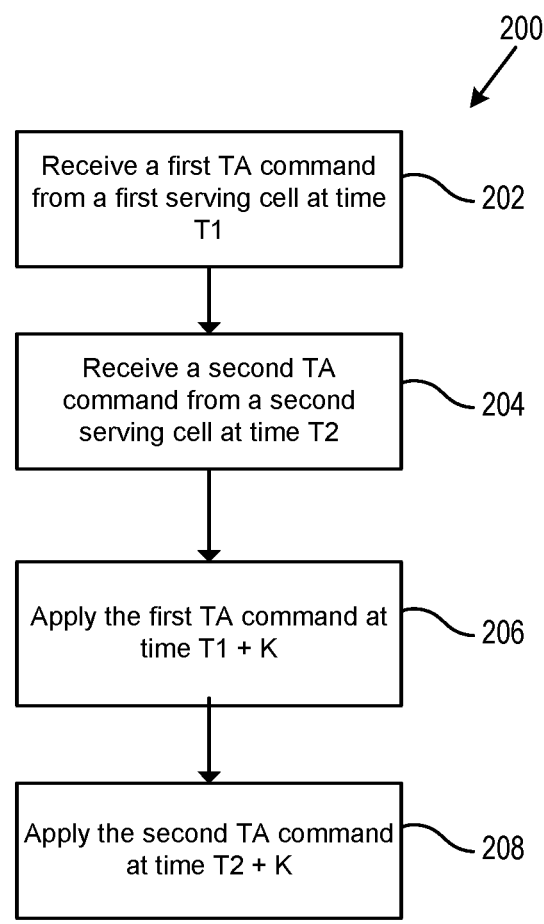
FIG. 2 is a flowchart of a method for timing advance adjustment delay for according to one embodiment.

FIG. 2 is a flowchart of a method 200 for TA adjustment delay for CA or DC with multiple TTIs according to one embodiment. The method 200 includes receiving 202 a first TA command from a first serving cell at time T1. The method 200 further includes receiving 204 a second TA command from a second serving cell at time T2 (where T2≠T1). The method 200 further includes applying 206 the first TA command at time T1+K, where K is a constant TA adjustment delay that is imposed on TA commands from each of the first and second serving cells. The method further includes applying 208 the second TA adjustment at time T2+K (again, where K is a constant TA adjustment delay period that is imposed on TA commands from each of the first and second serving cells).

Supposing that multiple TA commands are not received from multiple serving cells at the same time, the method 200 recognizes that the use of a constant TA adjustment delay K with TA commands received on both component carriers (rather than a TA adjustment delay based on the TTI length used on the serving cell providing the TA command, which may vary between serving cells) helps avoid simultaneous application of multiple TA commands received between those two component carriers.

The constant TA adjustment delay K may be an amount of time unrelated to the type of TTI from either PCell or SCell. In certain embodiments, however, the UE adjusts the uplink timing at the first subframe boundary following the selected TA adjustment delay. Further, it is contemplated that the constant TA adjustment delay K may be measured in terms of time (e.g., milliseconds), TTIs, subframes, slots, subslots, or any other unit of measure which may be used to provide a constant TA adjustment delay.

Multiple systems using CA/DC and capable of using the method described in FIG. 2 are possible. For example, one system may be configured to apply a constant delay K to a TA command received from a first serving cell on a first component carrier even in cases where there is no intervening TA command is received from a second serving cell on a second component carrier. Another system may only apply constant delay K to a TA command received on a first component carrier in the case that an intervening TA command is received on a second component carrier prior to the TA event corresponding to the first TA command. Otherwise, it may simply use the TA adjustment delay associated with the type of TTI or TTI length used by the serving cell corresponding to the first component carrier, because with only one TA command received prior to that TA command's application, there is no chance for a conflict.

Figure 3:
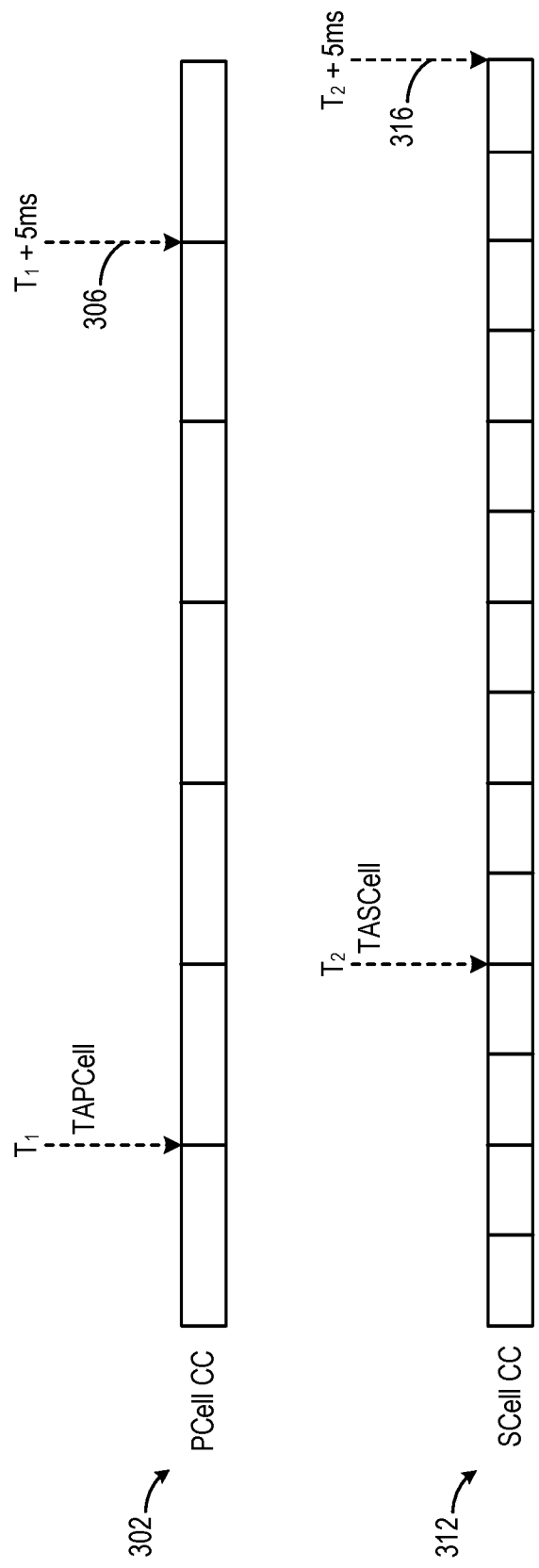
FIG. 3 is a diagram illustrating an example timing advance scenario according to one embodiment.

FIG. 3 is a diagram illustrating a timing scenario wherein an example constant TA adjustment delay of 5 ms is used for multiple serving cells, according to the method shown in FIG. 2. In FIG. 3, a UE (not shown) utilizes carrier aggregation and/or dual connectivity methods and is in communication with a PCell (not shown) and an SCell (not shown). The UE receives signals from the PCell on a PCell component carrier 302 and from the SCell on an SCell component carrier 312. In this example, the PCell component carrier 302 is configured for 1 ms TTI, each TTI corresponding to a subframe (seven shown). The SCell component carrier 312 is configured for slot TTI, each TTI corresponding to a 0.5 ms slot (fourteen shown). Following the method discussed in relation to FIG. 2, the PCell component carrier 302 is configured for an n+5 ms TA adjustment delay scheme and the SCell component carrier 312 is configured for an n+5 ms TA adjustment delay scheme. The choice of 5 ms is less than the LTE TA adjustment delay of n+6, and is provided by way of example. Skilled persons will recognize from the disclosure herein that other predetermined TA adjustment delays may also be used for both the PCell and the SCell.

In the example of FIG. 3, the UE receives a PCell TA command (TAPCell) from the PCell at time T1. The UE applies the PCell TA command (TAPCell) at time 306 (T1+5 ms). The UE also receives an SCell TA command (TASCell) from the SCell at time T2. The UE applies the SCell TA command (TASCell) at time 316 (T2+5 ms). As shown, the time 306 is different than the time 316. Thus, there is no issue with simultaneous TA command application at the UE.

Figure 4:
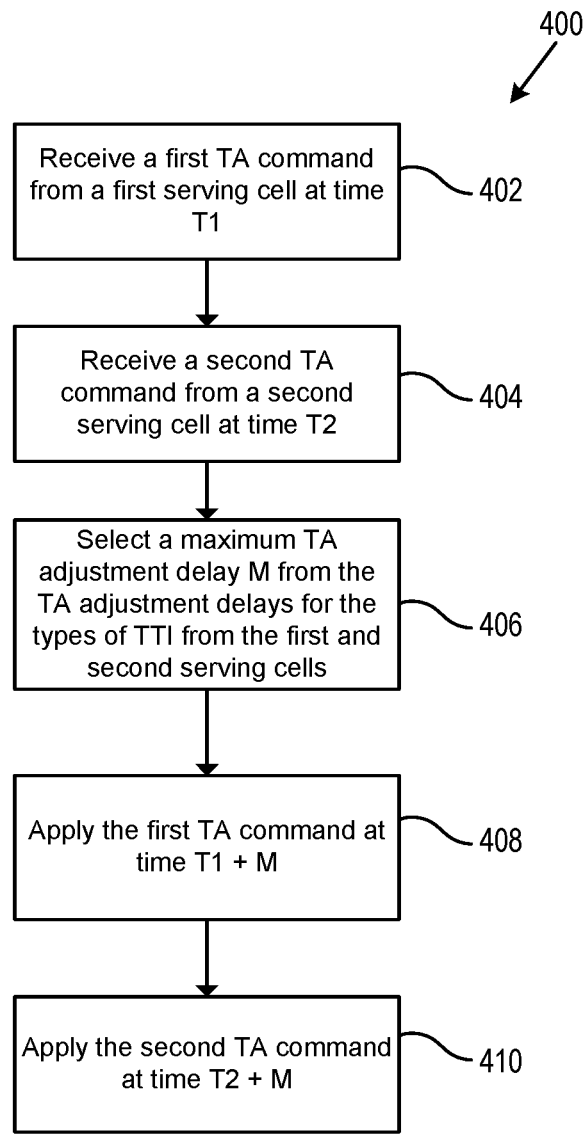
FIG. 4 is a flowchart of a method for timing advance adjustment delay according to one embodiment.

FIG. 4 is a flowchart of a method 400 for TA adjustment delay for CA or DC with multiple TTIs according to one embodiment. The method 400 includes receiving 402 a first TA command from a first serving cell at time T1. The method 400 further includes receiving 404 a second TA command from a second serving cell at time T2 (where T2≠T1). The method 400 further includes selecting 406 a maximum TA adjustment delay from (i.e., the larger of) the TA adjustment delays for the types of TTI from the first and second serving cells. The method 400 further includes applying 408 the first TA command at time T1+M. The method 400 further includes applying 410 the second TA command at time T2+M.

Modifications of the method 400 are contemplated. For example, it may be that selecting 406 a maximum adjustment delay M occurs at a time prior to the actual receipt and/or receipt of a first and/or second TA command from one or both of the serving cells. This may occur because the UE is capable of determining the TA adjustment delays associated with the types of TTI from the first and second serving cells prior to the actual receipt of one or more TA commands from the first and second serving cells.

Supposing that multiple TA commands are not received from multiple serving cells at the same time, the method 400 recognizes that the use of a single TA adjustment delay M on TA commands received on both component carriers (rather than a TA adjustment delay based on the TTI length used on the serving cell providing the TA command, which may vary between serving cells) helps avoid simultaneous application of multiple TA commands received between those two component carriers. The single TA adjustment delay M may be measured in terms of time (e.g., milliseconds), TTIs, subframes, slots, sub-slots, or any other unit of measure which may be used to provide a constant TA adjustment delay.

Multiple systems using CA/DC and capable of using the method described in FIG. 4 are possible. For example, one system may be configured to apply a single delay M to a TA command received on a first component carrier even in cases where there is no intervening TA command from a second serving cell is received on a second component carrier. Another system may only apply a single delay M to a TA command from a first serving cell on a first component carrier in the case that an intervening TA command is received from a second serving cell on a second component carrier. Otherwise, it may simply use the TA adjustment delay associated with the type of TTI or TTI length used by the serving cell corresponding to the first component carrier, because with only one TA command received prior to that TA command's application, there is no chance for a conflict.

In certain embodiments, systems capable of using the method shown in FIG. 4 may compare the TA adjustment delays associated with the various types of TTI used by separate serving cells (no matter how those delays are measured) by reducing those different amounts to one or more raw time amounts. These raw time amounts may then be how the TA adjustment delay that is applied to TA commands from any serving cell is measured. Alternatively, it is also possible that some measurements of TA adjustment delay corresponding to the types of TTI used by different serving cells are amenable to being compared without being reduced to raw time amounts (e.g., two serving cells using TTI schemes corresponding to a 5 slot and 6 slot delay, respectively). In this case, the longer delay that is applied to the TA commands from the serving cells serving the UE may instead, but is not required to, be measured in those terms (e.g., 6 slots). Further, it is contemplated that comparisons between delay schemes with other common factors may be compared and delays calculated and applied, by leveraging those common factors and without calculating raw time amounts (e.g., modifying subslots by a factor of 2 to compare them to slots, which are twice the length of a subslot, and applying the TA adjustment delay to TA commands from any serving cell in terms of slots).

Figure 5:
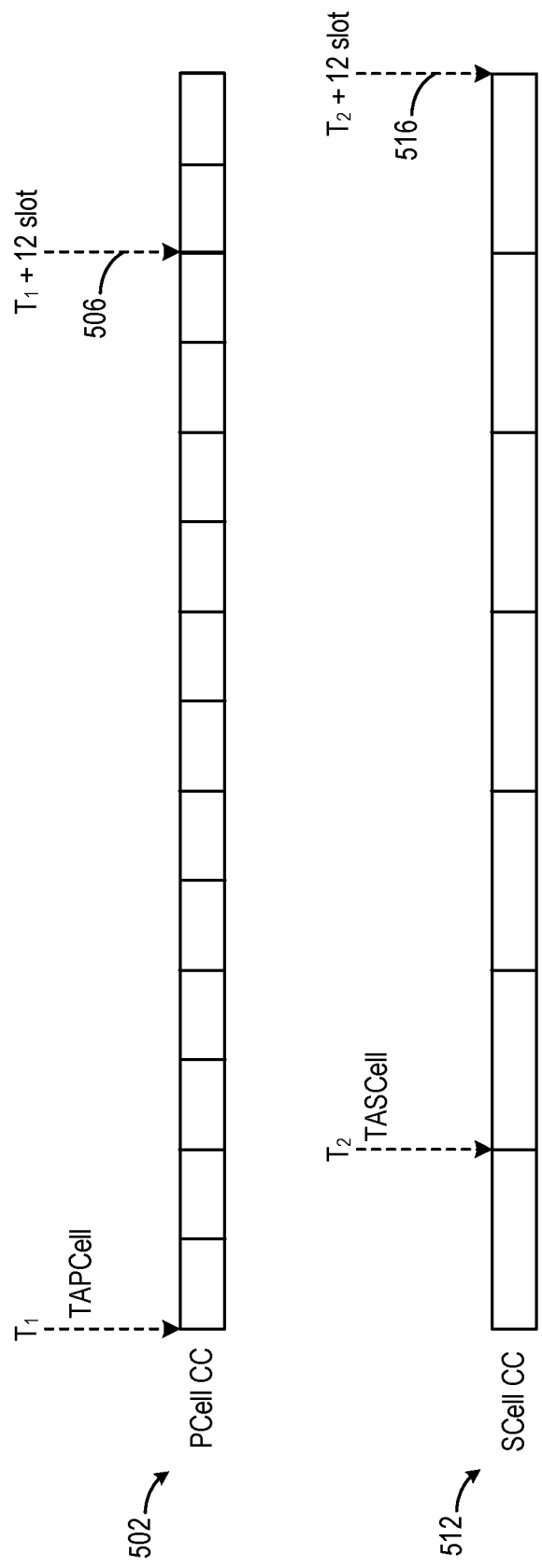
FIG. 5 is a diagram illustrating an example timing advance scenario according to one embodiment.

FIG. 5 is a diagram illustrating a timing scenario wherein a maximum value of a TA adjustment delay is used across multiple component carriers, according to the method shown in FIG. 4. In FIG. 5, a UE (not shown) utilizes carrier aggregation and/or dual connectivity methods and is in communication with a PCell (not shown) and an SCell (not shown). The UE receives signals from the PCell on a PCell component carrier 502 and from the SCell on an SCell component carrier 512. In this example, the PCell component carrier 502 is configured for slot TTI (14 slots shown) and the SCell component carrier 312 is configured for subframe TTI (7 subframes shown). Also in this example, slot TTI is configured for a T+12 slot TA adjustment delay scheme and subframe TTI is configured for a T+5 subframe TA adjustment delay scheme, where T corresponds to a time (e.g., a slot or subframe) where a corresponding TA command is received. During CA or DC operation, according to the method discussed in relation to FIG. 4, the UE selects the T+12 slot TA adjustment delay for both the PCell component carrier 502 and the SCell component carrier 512, wherein the T+12 slot TA adjustment is larger than the T+5 subframe TA adjustment.

Thus, after the UE receives a PCell TA command (TAPCell) from the PCell at T1, the UE applies the PCell TA command (TAPCell) at time 506 (T1+12 slot). Further, after the UE receives an SCell TA command (TASCell) from the SCell at time T2, the UE applies the SCell TA command (TASCell) at time 516 (T2+12 slot). As shown, the time 506 is different than the time 516. Thus, there is no issue with simultaneous TA command application by the UE.

Figure 6:
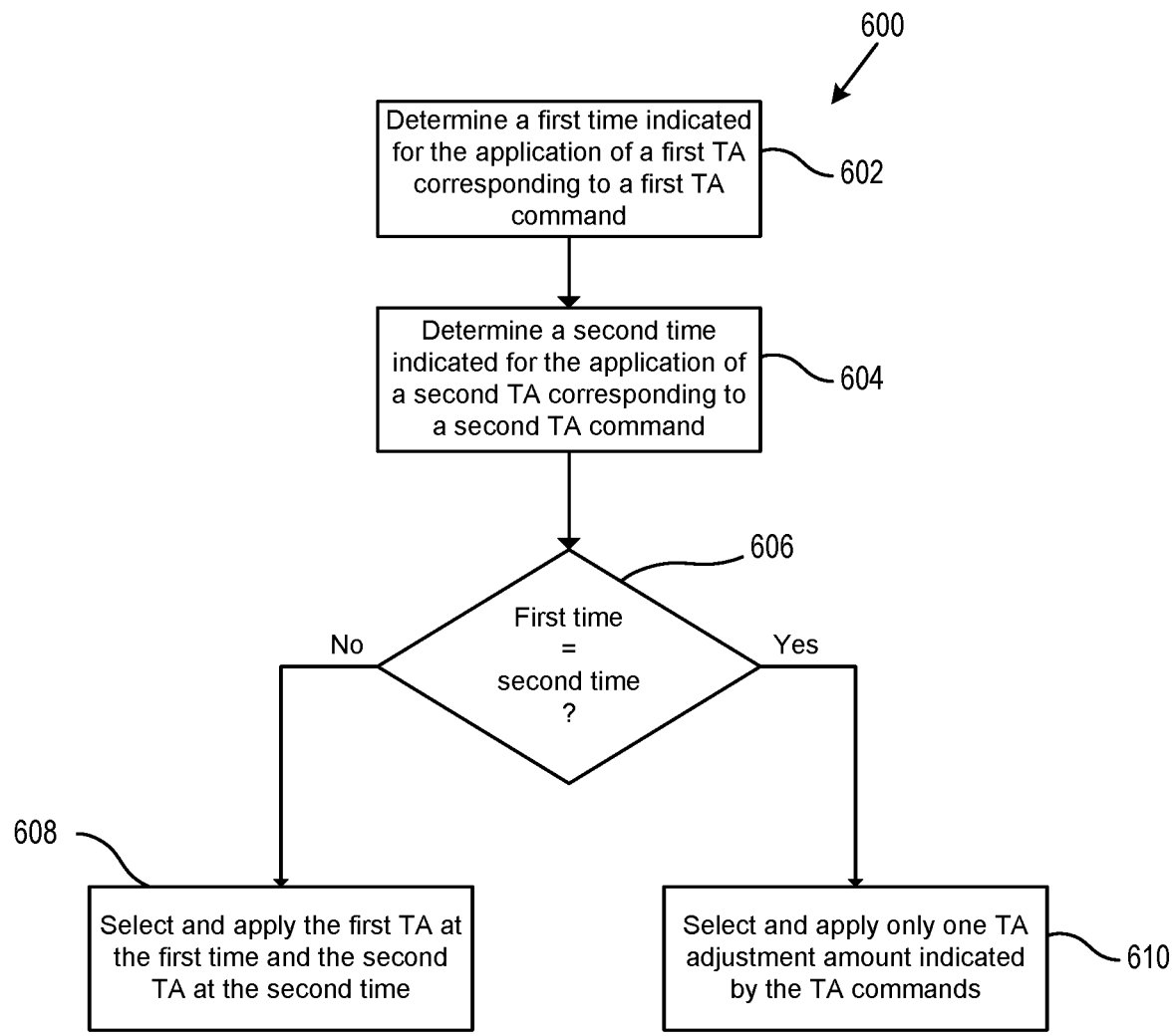
FIG. 6 is a flowchart of a method to determine a timing advance adjustment amount according to one embodiment.

FIG. 6 is a flowchart 600 of a method that may be used to determine a single TA adjustment amount to be applied by the UE at an indicated time when separate TA commands would otherwise require multiple TA adjustment amounts to apply simultaneously at the indicated time. As opposed to modifying the TA adjustment delay for one or more TA commands received on separate component carriers associated with separate serving cells (as described above in relation to FIGS. 2-5), the method 600 instead determines a single TA adjustment amount to use at the time indicated to apply after the associated TA adjustment delays.

The method 600 includes determining 602 a first time indicated for the application of a first TA corresponding to a first TA command. The method 600 further includes determining 604 a second time indicated for the application of a second TA event corresponding to a second TA command. The TA commands may be received on separate component carriers (as described above).

The method 600 further includes determining 606 whether the first time equals the second time. If the first time does not equal the second time, the method 600 includes selecting 608 and applying the first TA at the first time and the second TA at the second time. If, however, the first time equals the second time, the method 600 includes selecting 610 and applying only one TA adjustment amount indicated by the TA commands. The TA adjustment amount selected may be the largest of the instructed TA adjustment amounts, or it may be the smallest of the instructed TA adjustment amounts. For example, it may be advantageous to select the largest of the instructed TA adjustment amounts because that larger delay amount represents a delay that is known to be sufficiently long for each of the multiple carriers corresponding to the serving nodes that sent the conflicting TA commands to continue communicating with a UE without error. It is contemplated that a TA adjustment amount selected may instead be the smallest of the instructed TA adjustment amounts, or perhaps some other instructed TA adjustment amount. For example, in some embodiments, the UE selects the TA adjustment amount received in the TA command from the PCell. In other embodiments, the UE may select the TA adjustment amount received in the TA command from an SCell.

While the method 600 has been described in terms of a two TA commands, persons skilled in the art will recognize that the method 600 can be extended. It is anticipated that a given CA/DC case may use more than two component carriers at once, thus making it possible that three, four, seven, or any other number of TA commands might indicate that multiple (and differing) TA adjustment amounts be applied simultaneously. Any number and any combination of any plurality of TA commands can be compared, and a single TA adjustment amount picked from those TA commands, using the principles disclosed in the method 600.

As discussed above, a TA command may be associated with a TA group (TAG), wherein the cells in the TAG use the same TA. In certain embodiments, upon reception of a TA command or a timing adjustment indication for a TAG including the primary cell or PSCell, the UE adjusts uplink transmission timing (e.g., for physical uplink control channel (PUCCH), physical uplink shared channel (PUSCH), and/or sounding reference signal (SRS)) of the primary cell or PSCell based on the received TA command or the timing adjustment indication. The uplink transmission timing for PUSCH and/or SRS of a secondary cell may be the same as the primary cell, if the secondary cell and the primary cell belong to the same TAG. In certain embodiments, if the UE is configured with a secondary cell group (SCG), the uplink transmission timing for PUSCH and/or SRS of a second cell other than the PSCell may be the same as the PSCell, if the secondary cell and the PSCell belong to the same TAG.

In addition, or in other embodiments, upon reception of a TA command or a timing adjustment indication for a TAG not including the primary cell or PSCell, if all serving cells in the TAG have the same frame structure type, the UE adjusts uplink transmission timing for PUSCH and/or SRS of all the secondary cells in the TAG based on the received TA command or the timing adjustment indication, where the uplink transmission timing for PUSCH and/or SRS is the same for all the secondary cells in the TAG. In certain embodiments, upon reception of a TA command or a timing adjustment indication for a TAG not including the primary cell or PSCell, if a serving cell in the TAG has a different frame structure type compared to the frame structure type of another serving cell in the same TAG, the UE adjusts the uplink transmission timing for PUSCH and/or SRS of all the secondary cells in the TAG using a predetermined offset value regardless of the frame structure type of the serving cells and based on the received TA command or the timing adjustment indication, where the uplink transmission timing for PUSCH and/or SRS is the same for all the secondary cells in the TAG.

The embodiments herein apply to various processing time reduction schemes. For example, in certain embodiments, when 1 ms TTI and 4 subframe hybrid automatic repeat request (HARQ) processing is used, the UE adjusts the timing of its uplink transmission timing at subframe n+6 for a TA command received in subframe n. However, when 1 ms TTI and 3 subframe HARQ processing is used and the TA command is received in subframe n, the UE adjusts the timing of its uplink transmission timing at subframe n+5. Further, when slot TTI is used, the UE adjusts the timing of its uplink transmission timing at slot p+8, where the TA command is received in slot p. For subslot TTI with 4 subslot HARQ processing, the UE adjusts the timing of its uplink transmission timing at q+16, where the TA command is received in subslot q. Similarly, for subslot TTI with 6 subslot HARQ processing, the UE adjusts the timing of its uplink transmission timing at q+18, where the TA command is received in subslot q. For subslot TTI with 8 subslot HARQ processing, the UE adjusts the timing of its uplink transmission timing at q+20, where the TA command is received in subslot q. Many other examples are possible. In certain embodiments of these examples, the UE adjusts the uplink timing at the first subframe boundary following the indicated TA adjustment delays.

The following are additional examples, according to certain embodiments.

In example 1A, under the carrier aggregation case, the timing advance (TA) adjustment delay may be n+5 ms for both 1 ms transmission time interval (TTI), 7OS (1-slot) TTI, and 2OS TTI.

In example 2A, under the dual connectivity case, the TA adjustment delay may be n+5 ms for both 1 ms TTI, 7OS (1-slot) TTI, and 2OS TTI.

In example 3A, one uniform TA adjustment delay may be used for different (shortened) TTIs under carrier aggregation/dual connectivity.

In example 4A, under the carrier aggregation case, different TA adjustment delays for different TTIs may result in multiple timing adjustments simultaneously being implemented at one user equipment (UE).

In example 5A, under the dual connectivity case, different TA adjustment delays for different TTIs may result in multiple timing adjustments simultaneously being implemented at one UE.

Example 6A may include an apparatus comprising means to perform one or more elements of a method described in or related to any of examples 1A-5A, or any other method or process described herein.

Example 7A may include one or more non-transitory computer-readable media comprising instructions to cause an electronic device, upon execution of the instructions by one or more processors of the electronic device, to perform one or more elements of a method described in or related to any of examples 1A-5A, or any other method or process described herein.

Example 8A may include an apparatus comprising logic, modules, or circuitry to perform one or more elements of a method described in or related to any of examples 1A-5A, or any other method or process described herein.

Example 9A may include a method, technique, or process as described in or related to any of examples 1A-5A, or portions or parts thereof.

Example 10A may include an apparatus comprising: one or more processors and one or more computer readable media comprising instructions that, when executed by the one or more processors, cause the one or more processors to perform the method, techniques, or process as described in or related to any of examples 1A-5A, or portions thereof.

Example 11A may include a signal as described in or related to any of examples 1A-5A, or portions or parts thereof.

Example 1B may include a user equipment (UE) comprising: means for identifying or causing to identify a plurality of signals respectively from different serving cells; means for processing or causing to process the plurality of received signals; means for identifying or causing to identify, based on the processed plurality of received signals, time advance (TA) adjustment delays respectively for a plurality of transmission time intervals from the different serving cells; and means for determining or causing to determine a TA adjustment delay for the UE.

Example 2B may include the subject matter of example 1B, or of any other example herein, wherein the TA adjustment delay for the UE is a maximum value of the respective TA adjustment delays from the different serving cells.

Example 3B may include the subject matter of example 1B, or of any other example herein, wherein one or more serving cells may respectively have different TTIs.

Example 4B may include the subject matter of example 1B, or of any other example herein, wherein the plurality of signals are received using carrier aggregation (CA).

Example 5B may include the subject matter of example 1B, or of any other example herein, wherein the plurality of signals are received using dual connectivity (DC).

Example 6B may include an evolved NodeB (eNB) comprising: means for determining or causing to determine a transmission time interval (TTI) to transmit to a user equipment (UE); and means for transmitting or causing to transmit the determined TTI to the UE.

Example 7B may include the subject matter of example 6B, or of any other example herein, wherein means for transmitting or causing to transmit the determined TTI further includes means for transmitting or causing to transmit the determined TTI using carrier aggregation (CA) or dual connectivity (DC).

Example 8B may include under the CA/DC case, the TA adjustment delay could be maximum value of the TA adjustment delays for the TTIs from different serving cells.

Example 9B may include under the CA/DC case, one unique TA adjustment delay should be applied at UE even if serving cells transmit with different TTIs.

Example 10B may include it has observed that under the CA/DC case, different TA adjustment delays for the TTIs from different serving cells may result in multiple timing adjustments simultaneously be implemented at UE.

Example 11B may include user equipment (UE) to: identify or cause to identify a plurality of signals respectively from different serving cells; process or cause to process the plurality of received signals; identify or cause to identify, based on the processed plurality of received signals, time advance (TA) adjustment delays respectively for a plurality of transmission time intervals from the different serving cells; and determine or cause to determine a TA adjustment delay for the UE.

Example 12B may include the subject matter of example 11B, or of any other example herein, wherein the TA adjustment delay for the UE is a maximum value of the respective TA adjustment delays from the different serving cells.

Example 13B may include the subject matter of example 11B, or of any other example herein, wherein one or more serving cells may respectively have different TTIs.

Example 14B may include the subject matter of example 11B, or of any other example herein, wherein the plurality of signals are received using carrier aggregation (CA).

Example 15B may include the subject matter of example 11B, or of any other example herein, wherein the plurality of signals are received using dual connectivity (DC).

Example 16B may include an evolved NodeB (eNB) to: determine or cause to determine a transmission time interval (TTI) to transmit to a user equipment (UE); and transmit or cause to transmit the determined TTI to the UE.

Example 17B may include the subject matter of example 16B, or of any other example herein, wherein transmit or cause to transmit the determined TTI further includes transmit or cause to transmit the determined TTI using carrier aggregation (CA) or dual connectivity (DC).

Example 18B may include a method for implementing a user equipment (UE) comprising: identifying or causing to identify a plurality of signals respectively from different serving cells; processing or causing to process the plurality of received signals; identifying or causing to identify, based on the processed plurality of received signals, time advance (TA) adjustment delays respectively for a plurality of transmission time intervals from the different serving cells; and determining or causing to determine a TA adjustment delay for the UE.

Example 19B may include the subject matter of example 18B, or of any other example herein, wherein the TA adjustment delay for the UE is a maximum value of the respective TA adjustment delays from the different serving cells.

Example 20B may include the subject matter of example 18B, or of any other example herein, wherein one or more serving cells may respectively have different TTIs.

Example 21B may include the subject matter of example 18B, or of any other example herein, wherein the plurality of signals are received using carrier aggregation (CA).

Example 22B may include the subject matter of example 18B, or of any other example herein, wherein the plurality of signals are received using dual connectivity (DC).

Example 23B may include a method for implementing an evolved NodeB (eNB) comprising: determining or causing to determine a transmission time interval (TTI) to transmit to a user equipment (UE); and transmitting or causing to transmit the determined TTI to the UE.

Example 24B may include the subject matter of example 23B, or of any other example herein, wherein transmitting or causing to transmit the determined TTI further includes transmitting or causing to transmit the determined TTI using carrier aggregation (CA) or dual connectivity (DC).

Example 25B may include an apparatus comprising means to perform one or more elements of a method described in or related to any of examples 1B-24B, or any other method or process described herein.

Example 26B may include one or more non-transitory computer-readable media comprising instructions to cause an electronic device, upon execution of the instructions by one or more processors of the electronic device, to perform one or more elements of a method described in or related to any of examples 1B-24B, or any other method or process described herein.

Example 27B may include an apparatus comprising logic, modules, or circuitry to perform one or more elements of a method described in or related to any of examples 1B-24B, or any other method or process described herein.

Example 28B may include a method, technique, or process as described in or related to any of examples 1B-24B, or portions or parts thereof.

Example 29B may include an apparatus comprising: one or more processors and one or more computer readable media comprising instructions that, when executed by the one or more processors, cause the one or more processors to perform the method, techniques, or process as described in or related to any of examples 1B-24B, or portions thereof.

Example 30B may include a signal as described in or related to any of examples 1B-24B, or portions or parts thereof.

Example 31B may include a signal in a wireless network as shown and described herein.

Example 32B may include a method of communicating in a wireless network as shown and described herein.

Example 33B may include a system for providing wireless communication as shown and described herein.

Example 34B may include a device for providing wireless communication as shown and described herein.

Figure 7:
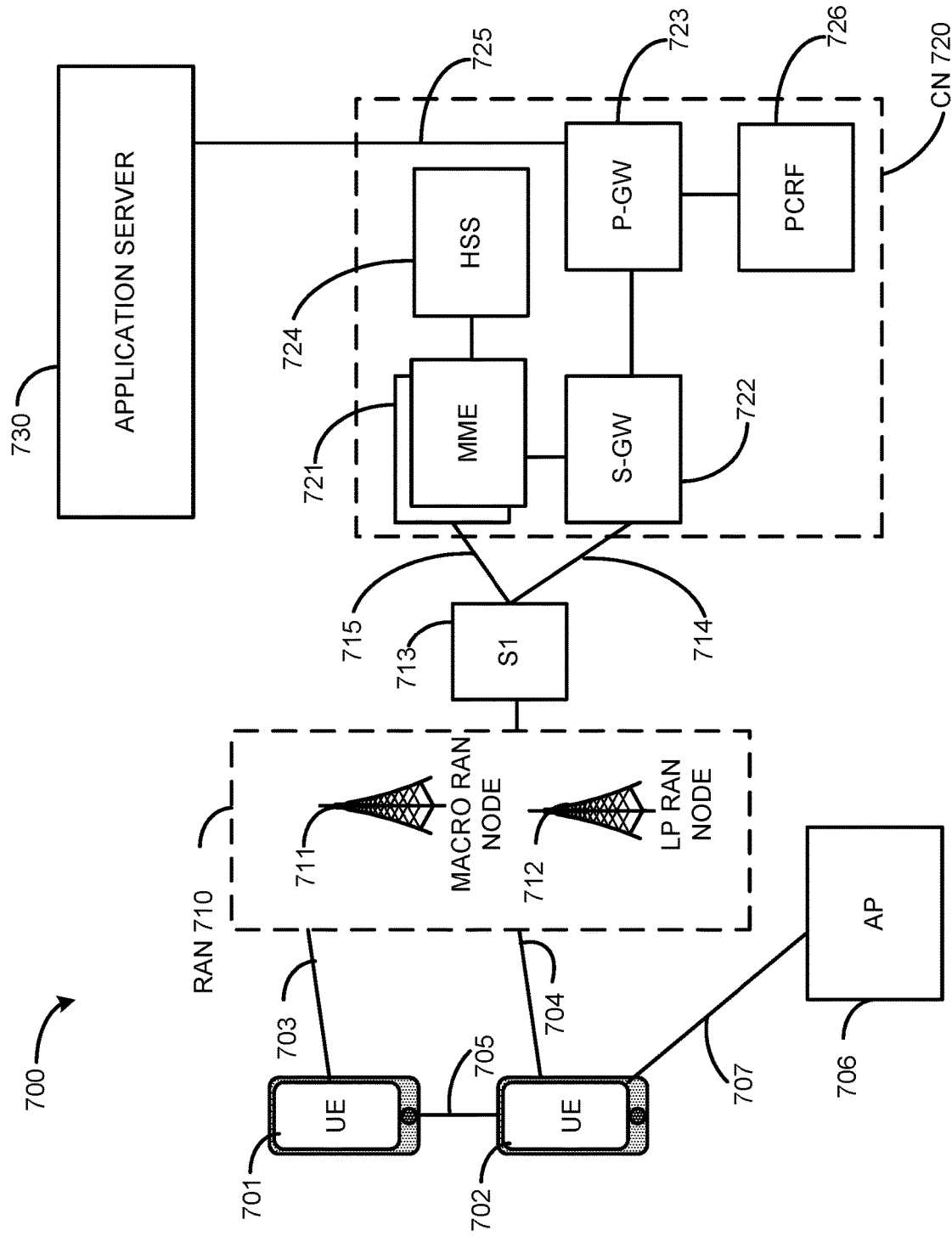
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 may be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and a serving gateway (S-GW) 722, and an S1-mobility management entity (MME) interface 715, which is a signaling interface between the RAN nodes 711 and 712 and MMEs 721.

In this embodiment, the CN 720 comprises the MMEs 721, the S-GW 722, a Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the CN 720 (e.g., an EPC network) and external networks such as a network including the application server 730 (alternatively referred to as application function (AF)) via an Internet Protocol (IP) interface 725. Generally, an application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. A Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
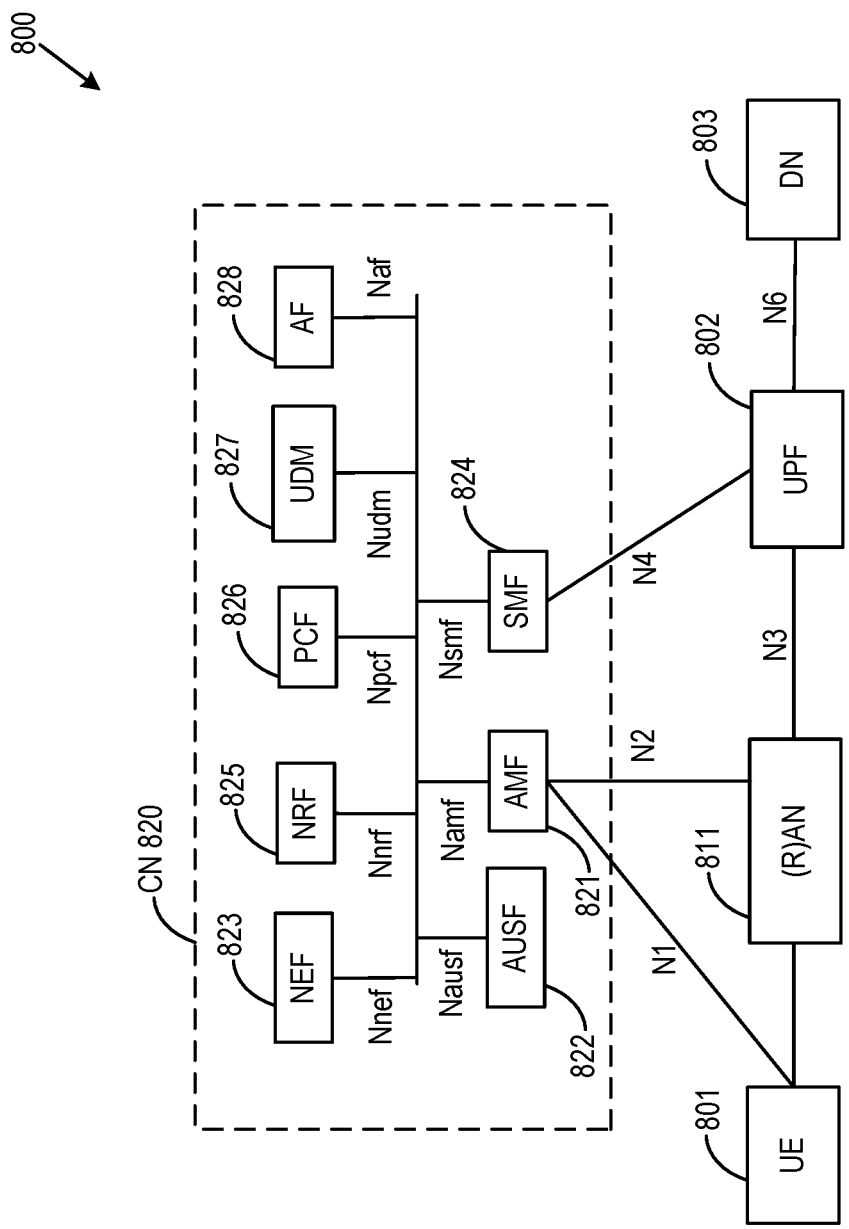
FIG. 8 illustrates an architecture of a system of a network in accordance with some embodiments.

FIG. 8 illustrates an architecture of a system 800 of a network in accordance with some embodiments. The system 800 is shown to include a UE 801, which may be the same or similar to UEs 701 and 702 discussed previously; a RAN node 811, which may be the same or similar to RAN nodes 711 and 712 discussed previously; a User Plane Function (UPF) 802; a Data network (DN) 803, which may be, for example, operator services, Internet access or 3rd party services; and a 5G Core Network (5GC or CN) 820.

The CN 820 may include an Authentication Server Function (AUSF) 822; a Core Access and Mobility Management Function (AMF) 821; a Session Management Function (SMF) 824; a Network Exposure Function (NEF) 823; a Policy Control function (PCF) 826; a Network Function (NF) Repository Function (NRF) 825; a Unified Data Management (UDM) 827; and an Application Function (AF) 828. The CN 820 may also include other elements that are not shown, such as a Structured Data Storage network function (SDSF), an Unstructured Data Storage network function (UDSF), and the like.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. NY 803 may include, or be similar to application server 730 discussed previously.

The AUSF 822 may store data for authentication of UE 801 and handle authentication related functionality. Facilitates a common authentication framework for various access types.

The AMF 821 may be responsible for registration management (e.g., for registering UE 801, etc.), connection management, reachability management, mobility management, and lawful interception of AMF-related events, and access authentication and authorization. AMF 821 may provide transport for SM messages between and SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface (N2 reference point), a termination point of NAS (N1) signaling, and perform NAS ciphering and integrity protection.

AMF 821 may also support NAS signaling with a UE 801 over an N3 interworking-function (IWF) interface. The N3IWF may be used to provide access to untrusted entities. N33IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signaling between the UE 801 and AMF 821, and relay uplink and downlink user-plane packets between the UE 801 and UPF 802. The N3IWF also provides mechanisms for IPsec tunnel establishment with the UE 801.

The SMF 824 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 824 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics.

The NRF 825 may support service discovery functions, receive NF Discovery Requests from NF instances, and provide the information of the discovered NF instances to the NF instances. NRF 825 also maintains information of available NF instances and their supported services.

The PCF 826 may provide policy rules to control plane function(s) to enforce them, and may also support unified policy framework to govern network behavior. The PCF 826 may also implement a front end (FE) to access subscription information relevant for policy decisions in a UDR of UDM 827.

The UDM 827 may handle subscription-related information to support the network entities' handling of communication sessions, and may store subscription data of UE 801. The UDM 827 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 826. UDM 827 may also support SMS management, wherein an SMS-FE implements the similar application logic as discussed previously.

The AF 828 may provide application influence on traffic routing, access to the Network Capability Exposure (NCE), and interact with the policy framework for policy control. The NCE may be a mechanism that allows the 5GC and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 820 may include an Nx interface, which is an inter-CN interface between the MME (e.g., MME 721) and the AMF 821 in order to enable interworking between CN 820 and CN 720.

Although not shown by FIG. 8, system 800 may include multiple RAN nodes 811 wherein an Xn interface is defined between two or more RAN nodes 811 (e.g., gNBs and the like) that connecting to 5GC 820, between a RAN node 811 (e.g., gNB) connecting to 5GC 820 and an eNB (e.g., a RAN node 711 of FIG. 7), and/or between two eNBs connecting to 5GC 820.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
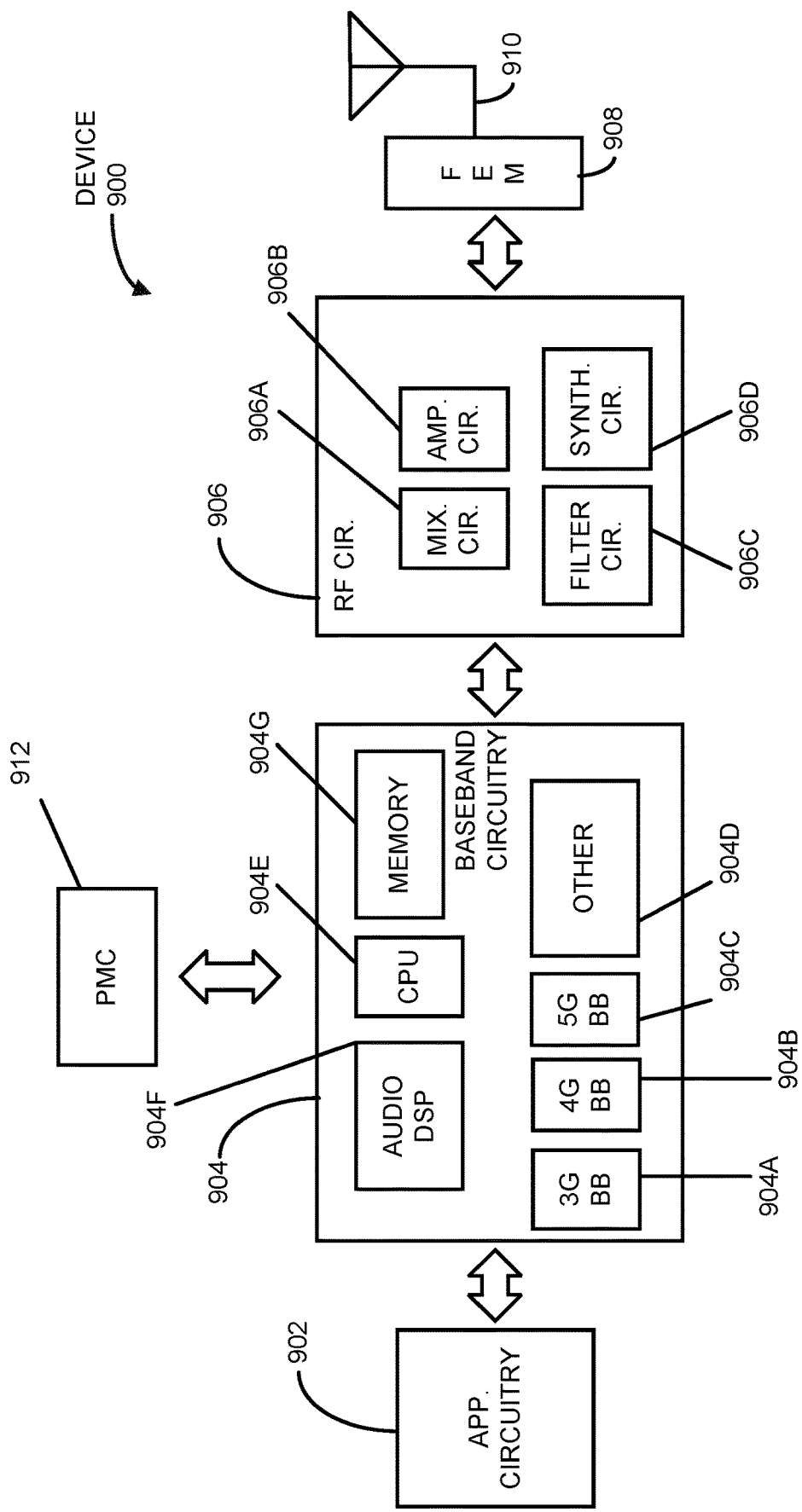
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. The RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by the filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. The FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by the RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device 900 is included in a UE. The PMC 912 may increase the power conversion efficiency while providing desirable implementation size and heat dissipation characteristics.

FIG. 9 shows the PMC 912 coupled only with the baseband circuitry 904. However, in other embodiments, the PMC 912 may be additionally or alternatively coupled with, and perform similar power management operations for, other components such as, but not limited to, the application circuitry 902, the RF circuitry 906, or the FEM circuitry 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
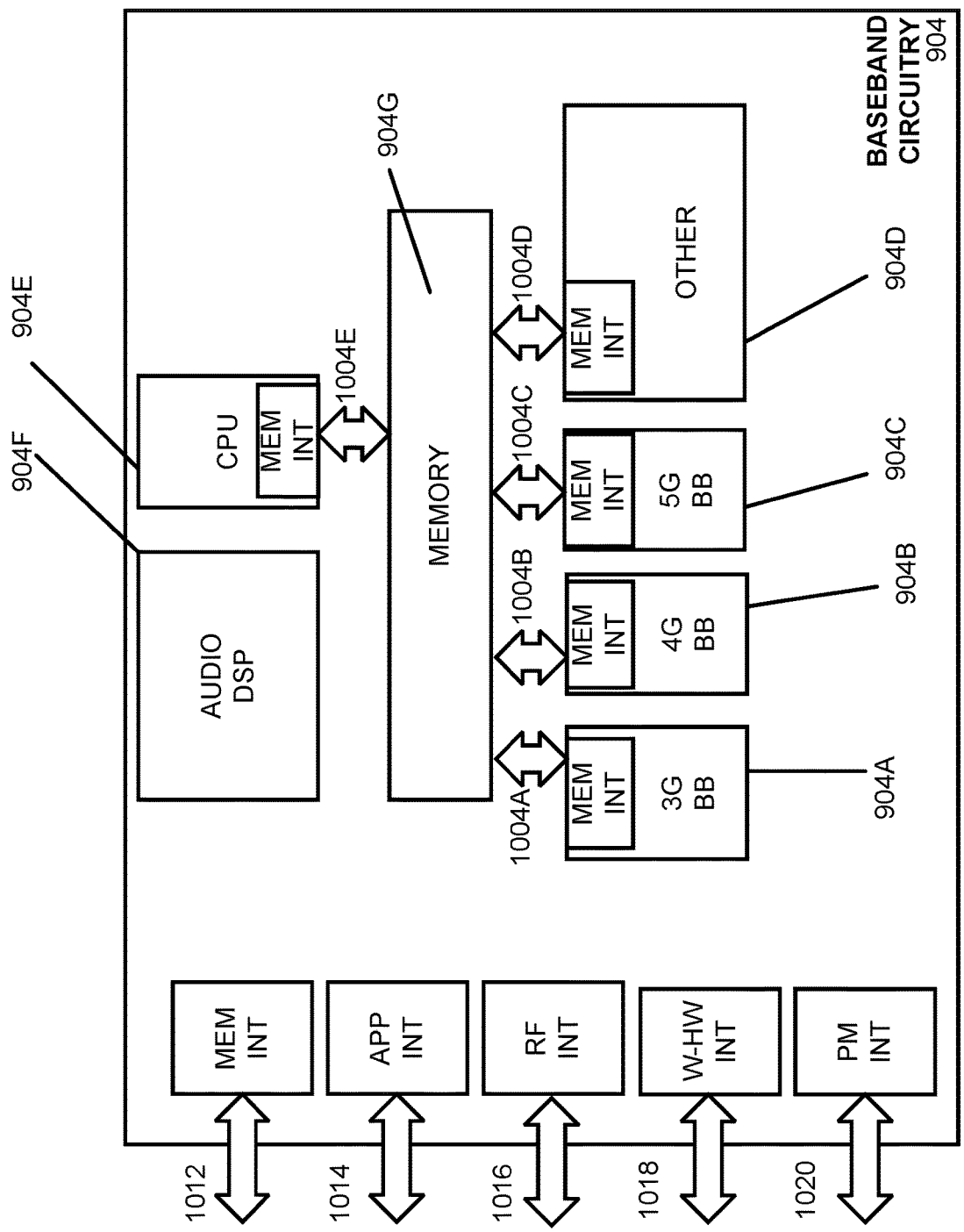
FIG. 10 illustrates example interfaces of baseband circuitry in accordance with some embodiments.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
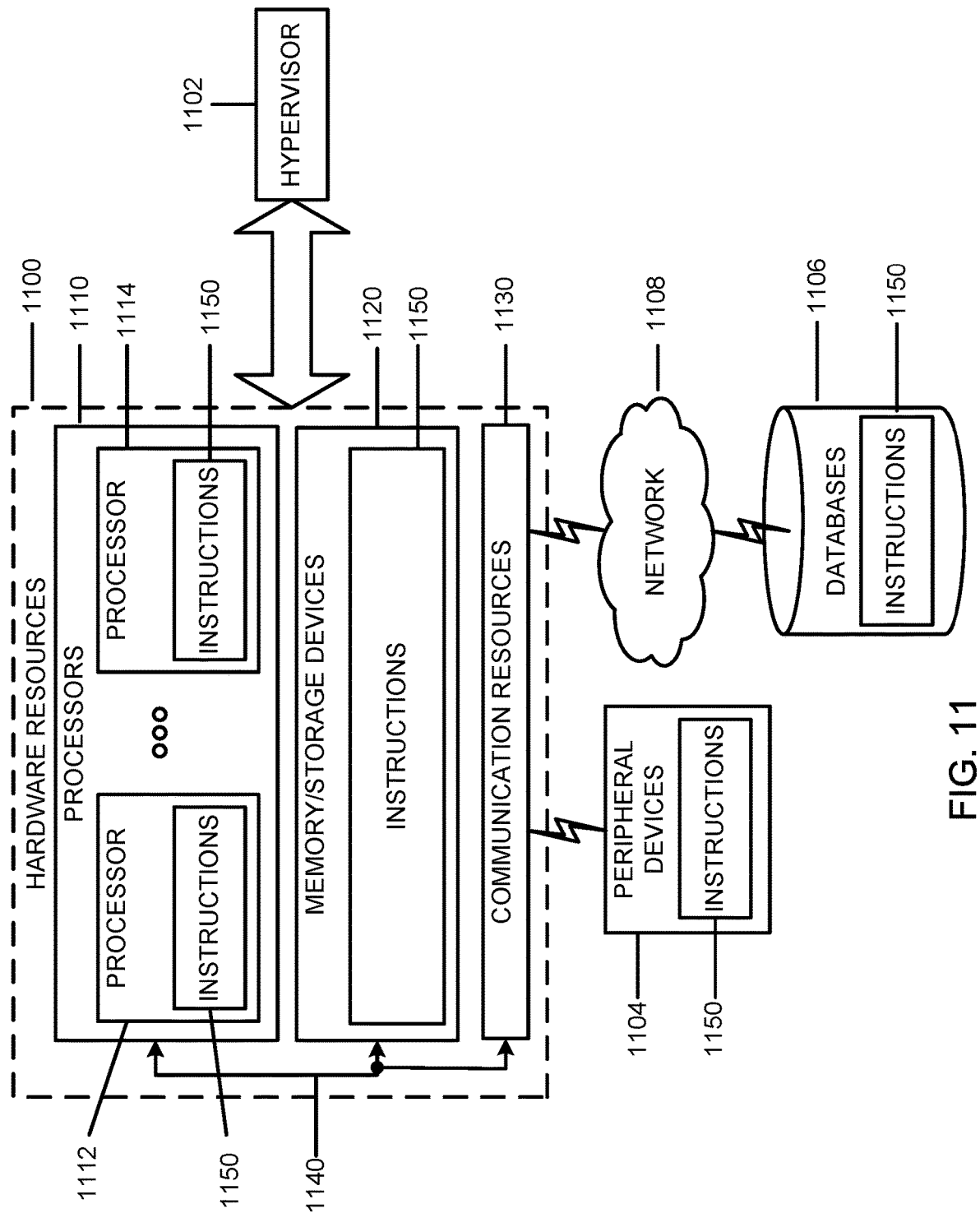
FIG. 11 is a block diagram illustrating components, according to some example embodiments, able to read instructions from a machine-readable or computer-readable medium and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

In embodiments, the device or components of FIGS. 9-11, and particularly the baseband circuitry of FIG. 10, may be to identify or cause to identify a plurality of signals respectively from different serving cells. The device may be further to process or cause to process the plurality of received signals. The device may be further to identify or cause to identify, based on the processed plurality of received signals, TA adjustment delays respectively for a plurality of transmission time intervals from the different serving cells. The device may be further to determine or cause to determine a TA adjustment delay for the UE.

In other embodiments, the device or components may be to determine or cause to determine a TTI to transmit to a UE. The device may be further to transmit or cause to transmit the determined TTI to the UE.

Figure 12:
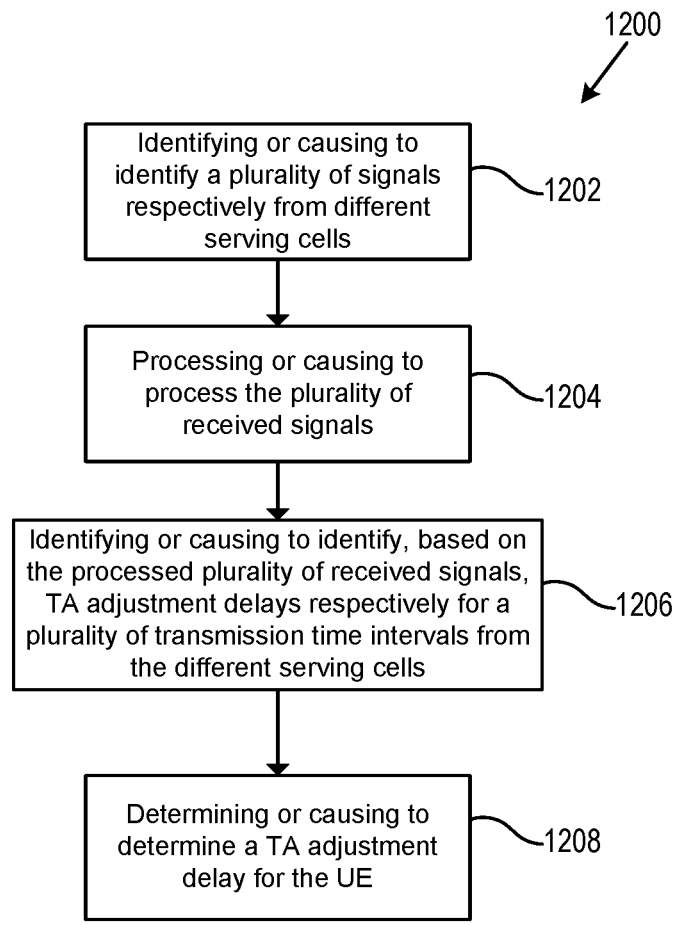
FIG. 12 is a flowchart of a method for a UE according to an example embodiment.

In some embodiments, the electronic device(s), network(s), system(s), chip(s) or component(s), or portions or implementations thereof, of FIG. 7, 9, or some other figure herein may be configured to perform one or more processes, techniques, or methods as described herein, or portions thereof. One such process is depicted in FIG. 12, which is a flowchart of a method 1200 for a UE according to an example embodiment. For example, the process 1200 may include identifying 1202 or causing to identify a plurality of signals respectively from different serving cells. The process 1200 may further include processing 1204 or causing to process the plurality of received signals. The process 1200 may further include identifying 1206 or causing to identify, based on the processed plurality of received signals, time advance (TA) adjustment delays respectively for a plurality of transmission time intervals from the different serving cells. The process 1200 may further include determining 1208 or causing to determine a TA adjustment delay for the UE.

Figure 13:
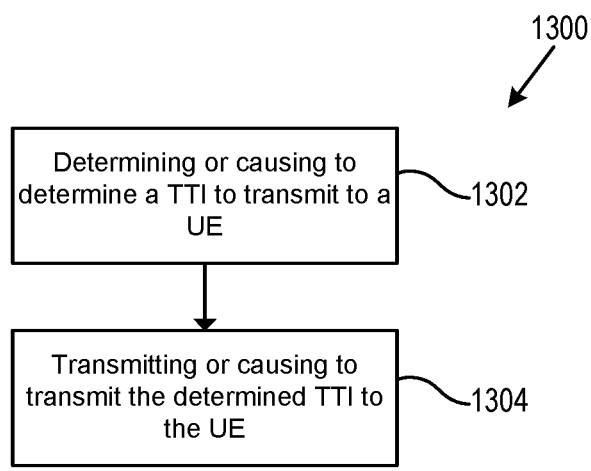
FIG. 13, which is a flowchart of a process for a RAN node according to an example embodiment.

In some embodiments, the electronic device(s), network(s), system(s), chip(s) or component(s), or portions or implementations thereof, of FIG. 7, 9, or some other figure herein may be configured to perform one or more processes, techniques, or methods as described herein, or portions thereof. One such process is depicted in FIG. 13, which is a flowchart of a process 1300 for a RAN node according to an example embodiment. For example, the process 1300 may include determining 1302 or causing to determine a TTI to transmit to a UE. The process 1300 may further include transmitting 1304 or causing to transmit the determined TTI to the UE.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., which perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

The following are additional examples, according to certain embodiments, which may be performed by the devices, networks, systems, chips, components, or portions thereof, shown in FIGS. 7-11.

Example 1 is an apparatus for a user equipment (UE). The apparatus includes a memory interface to send or receive and a baseband processor. The memory interface is to send or receive, to or from the memory device, a value selected from a first timing advance (TA) command to adjust a current uplink transmission timing of the UE or a second TA command to adjust the current uplink transmission timing of the UE. The baseband processor is to: decode a first subframe corresponding to a first downlink transmission from a first serving cell to obtain the first TA command; determine, based on a first transmission time interval (TTI) length corresponding to the first serving cell, a first TA adjustment delay to apply the first TA command at a first subframe boundary after the first subframe; decode a second subframe corresponding to a second downlink transmission from a second serving cell to obtain the second TA command; determine, based on a second TTI length corresponding to the second serving cell, a second TA adjustment delay to apply to the second TA command at a second subframe boundary after the second subframe, wherein the second TTI length is different than the first TTI length; select, based at least in part on the first TA adjustment delay and the second TA adjustment delay, the value from either the first TA command or the second TA command; and adjust, based on the value selected from either the first TA command or the second TA command, the current uplink transmission timing of the UE.

Example 2 is the apparatus of Example 1, wherein when the first subframe boundary and the second subframe boundary are substantially aligned in time, the baseband processor is configured to disregard one of the first TA command and the second TA command.

Example 3 is the apparatus of Example 2, wherein the baseband processor is configured for dual connectivity.

Example 4 is the apparatus of Example 2, wherein the baseband processor is configured for carrier aggregation, and wherein the first serving cell comprises a primary cell (PCell) and the second serving cell comprises a secondary cell (SCell).

Example 5 is the apparatus of Example 4, wherein the baseband processor is configured to select the value from the first TA command corresponding to the PCell.

Example 6 is the apparatus of Example 4, wherein the baseband processor is configured to select the value from the second TA command corresponding to the SCell.

Example 7 is the apparatus of any of Examples 1-6, wherein the first subframe corresponds the first TTI length, wherein the first subframe comprises two slots, and wherein the second TTI length is a short TTI (sTTI) length corresponding to a slot or subslot of the second subframe.

Example 8 is the apparatus of any of Examples 1-7, wherein the first TA adjustment delay is equal to the second TA adjustment delay.

Example 9 is the apparatus of Example 8, wherein the first TA adjustment delay and the second TA adjustment delay are both selected to be equal to n+5 TTI, wherein n corresponds to the respective subframe, slot, or subslot where the first TA command or the second TA command is received.

Example 10 is the apparatus of Example 8, wherein the first TTI length corresponds to a first predetermined TA adjustment delay, wherein the second TTI length corresponds to a second predetermined TA adjustment delay, and wherein the first TA adjustment delay and the second TA adjustment delay are selected to both be equal to a maximum value of the first predetermined TA adjustment delay and the second predetermined TA adjustment delay.

Example 11 is the apparatus of any of Examples 1-10, wherein: if the first subframe boundary occurs in time before the second subframe boundary, the baseband processor selects the value from the first TA command; and if the second subframe boundary occurs in time before the first subframe boundary, the baseband processor selects the value from the second TA command.

Example 12 is a computer-readable storage medium having computer-readable instructions stored thereon. The computer-readable instructions is to, when executed, instruct a processor of a user equipment (UE) to: identify a plurality of received signals respectively from different serving cells; process the plurality of received signals; identify, based on the processed plurality of received signals, time advance (TA) adjustment delays respectively for a plurality of transmission time intervals from the different serving cells; and determine a selected TA adjustment delay for the UE from among the TA adjustment delays identified respectively for the plurality of transmission time intervals from the different serving cells.

Example 13 is the computer-readable medium of Example 12, wherein one or more serving cells of the different serving cells have different transmission time intervals.

Example 14 is the computer-readable medium of Example 13, wherein two or more of the different transmission time intervals correspond to different predetermined TA adjustment delays.

Example 15 is the computer-readable medium of Example 14, wherein a first transmission time interval (TTI) corresponds to a subframe comprising fourteen orthogonal frequency division multiplexing (OFDM) symbols (OS), and wherein a second TTI corresponds to a slot comprising 7OS or to a subslot comprising 2OS.

Example 16 is the computer-readable medium of any of Examples 12-15, wherein the selected TA adjustment delay comprises five TTIs relative to the subframe, slot, or subslot in which a TA command is received.

Example 17 is the computer-readable medium of any of Examples 12-15, wherein the selected TA adjustment delay for the UE is a maximum value of the respective TA adjustment delays from the different serving cells.

Example 18 is the computer-readable medium of any of Examples 12-17, wherein the plurality of signals are received using carrier aggregation (CA).

Example 19 is the computer-readable medium of any of Examples 12-17, wherein the plurality of signals are received using dual connectivity (DC).

Example 20 is a user equipment (UE), comprising: means for identifying a plurality of received signals from different serving cells; means for processing the plurality of received signals; means for identifying, based on the processed plurality of received signals, time advance (TA) adjustment delays respectively for a plurality of transmission time intervals from the different serving cells; and means for determining a TA adjustment delay for the UE.

Example 21 is the UE of Example 20, wherein one or more serving cells of the different serving cells have different transmission time intervals.

Example 22 is the UE of Example 21, wherein two or more of the different transmission time intervals correspond to different predetermined TA adjustment delays.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a user equipment (UE), the apparatus comprising:
a memory interface to send or receive, to or from a memory device, a value selected from a first timing advance (TA) command to adjust a current uplink transmission timing of the UE or a second TA command to adjust the current uplink transmission timing of the UE; and
a baseband processor to:
decode a first subframe corresponding to a first downlink transmission from a first serving cell to obtain the first TA command;
determine, based on a first transmission time interval (TTI) length corresponding to the first serving cell, a first TA adjustment delay to apply the first TA command at a first subframe boundary after the first subframe, the first TA adjustment delay specifying a first duration after receiving the first TA command to wait prior to adjusting the current uplink transmission timing of the UE based on the first TA command;
decode a second subframe corresponding to a second downlink transmission from a second serving cell to obtain the second TA command;
determine, based on a second TTI length corresponding to the second serving cell, a second TA adjustment delay to apply to the second TA command at a second subframe boundary after the second subframe, wherein the second TTI length is different than the first TTI length, the second TA adjustment delay specifying a second duration after receiving the second TA command to wait prior to adjusting the current uplink transmission timing of the UE based on the second TA command;
select, based at least in part on the first TA adjustment delay and the second TA adjustment delay, the value from either the first TA command or the second TA command; and
adjust, based on the value selected from either the first TA command or the second TA command, the current uplink transmission timing of the UE;
wherein the first subframe corresponds the first TTI length, wherein the first subframe comprises two slots, and wherein the second TTI length is a short TTI (sTTI) length corresponding to a slot or subslot of the second subframe.

2. The apparatus of claim 1, wherein the baseband processor is configured to disregard one of the first TA command and the second TA command.

3. The apparatus of claim 2, wherein the baseband processor is configured for dual connectivity.

4. The apparatus of claim 2, wherein the baseband processor is configured for carrier aggregation, and wherein the first serving cell comprises a primary cell (PCell) and the second serving cell comprises a secondary cell (SCell).

5. The apparatus of claim 4, wherein the baseband processor is configured to select the value from the first TA command corresponding to the PCell.

6. The apparatus of claim 4, wherein the baseband processor is configured to select the value from the second TA command corresponding to the SCell.

7. The apparatus of claim 1, wherein the first TA adjustment delay is equal to the second TA adjustment delay.

8. The apparatus of claim 7, wherein the first TA adjustment delay and the second TA adjustment delay are both selected to be equal to n+5 TTI, wherein n corresponds to the respective subframe, slot, or subslot where the first TA command or the second TA command is received.

9. The apparatus of claim 7, wherein the first TTI length corresponds to a first predetermined TA adjustment delay, wherein the second TTI length corresponds to a second predetermined TA adjustment delay, and wherein the first TA adjustment delay and the second TA adjustment delay are selected to both be equal to a maximum value of the first predetermined TA adjustment delay and the second predetermined TA adjustment delay.

10. The apparatus of claim 1, wherein:
if the first subframe boundary occurs in time before the second subframe boundary, the baseband processor selects the value from the first TA command; and
if the second subframe boundary occurs in time before the first subframe boundary, the baseband processor selects the value from the second TA command.

11. A non-transitory computer-readable storage medium having computer-readable instructions stored thereon, the computer-readable instructions to, when executed, instruct a processor of a user equipment (UE) to:
identify a plurality of received signals respectively from different serving cells;
process the plurality of received signals;
identify, based on the processed plurality of received signals, time advance (TA) adjustment delays respectively for a plurality of transmission time intervals (TTI) from the different serving cells, each TA adjustment delay specifying a duration after receiving a TA command on a respective serving cell of the different serving cells to wait prior to adjusting a current uplink transmission timing of the UE based on the TA command; and
determine a TA adjustment delay for the UE from among the TA adjustment delays identified respectively for the plurality of TTI from the different serving cells by selecting a longest of the TA adjustment delays identified respectively for the plurality of TTI from the different serving cells to be the TA adjustment delay for the UE;
wherein a first TTI of the plurality of TTI corresponds to a subframe comprising fourteen orthogonal frequency division multiplexing (OFDM) symbols (OS), and wherein a second TTI of the plurality of TTI corresponds to a slot comprising 7OS or to a subslot comprising 2OS.

12. The non-transitory computer-readable medium of claim 11, wherein the first TTI and the second TTI correspond to different predetermined TA adjustment delays.

13. The non-transitory computer-readable medium of claim 11, wherein the TA adjustment delay for the UE comprises five TTIs relative to the subframe, slot, or subslot in which a TA command is received.

14. The non-transitory computer-readable medium of claim 11, wherein the TA adjustment delay for the UE is a maximum value of the respective TA adjustment delays from the different serving cells.

15. The non-transitory computer-readable medium of claim 11, wherein the plurality of signals are received using carrier aggregation (CA).

16. The non-transitory computer-readable medium of claim 11, wherein the plurality of signals are received using dual connectivity (DC).

17. A user equipment (UE), comprising:
means for identifying a plurality of received signals from different serving cells;
means for processing the plurality of received signals;
means for identifying, based on the processed plurality of received signals, time advance (TA) adjustment delays respectively for a plurality of transmission time intervals (TTI) from the different serving cells, each TA adjustment delay specifying a duration after receiving a TA command on a respective serving cell of the different serving cells to wait prior to adjusting a current uplink transmission timing of the UE based on the TA command; and
means for determining a TA adjustment delay for the UE from among the TA adjustment delays identified respectively for the plurality of TTI from the different serving cells by selecting a longest of the TA adjustment delays identified respectively for the plurality of TTI from the different serving cells to be the TA adjustment delay for the UE;
wherein a first TTI of the plurality of TTI corresponds to a subframe comprising fourteen orthogonal frequency division multiplexing (OFDM) symbols (OS), and wherein a second TTI of the plurality of TTI corresponds to a slot comprising 7OS or to a subslot comprising 2OS.

18. The UE of claim 17, wherein the first TTI and the second TTI each correspond to different predetermined TA adjustment delays.

* * * * *